United States Patent [19]

Jackson

[11] Patent Number: 5,315,855
[45] Date of Patent: May 31, 1994

[54] CAM OPERATED HEMMING APPARATUS

[76] Inventor: Donald T. Jackson, 1159 Ashley, Troy, Mich. 48098

[21] Appl. No.: 20,195

[22] Filed: Feb. 19, 1993

Related U.S. Application Data

[60] Continuation-in-part of Ser. No. 784,381, Oct. 29, 1991, abandoned, which is a division of Ser. No. 730,582, Jul. 15, 1991, Pat. No. 5,085,480.

[51] Int. Cl.$^5$ .............................................. B21D 39/02
[52] U.S. Cl. ................................... 72/315; 72/452; 29/243.58
[58] Field of Search ................................ 72/312–315, 72/322, 323, 306, 452, 388; 29/243.58, 243.57, 243.5

[56] References Cited

U.S. PATENT DOCUMENTS

| | | |
|---|---|---|
| Re. 31,991 | 9/1985 | Descoteaux et al. ................. 294/88 |
| 759,217 | 5/1904 | Holden .................................. 72/306 |
| 770,270 | 9/1904 | Dehn . |
| 1,739,152 | 12/1929 | Larsen . |
| 2,364,239 | 12/1944 | Parks . |
| 2,378,570 | 6/1945 | Mitchell . |
| 2,641,806 | 6/1953 | Leckrone . |
| 2,730,719 | 1/1956 | Steiner . |
| 2,850,926 | 9/1958 | Jobe . |
| 2,925,848 | 2/1960 | Berkhimer ........................ 29/243.57 |
| 3,026,520 | 3/1962 | Albrecht . |
| 3,037,208 | 6/1962 | Haberstump . |
| 3,084,893 | 4/1963 | Ruth . |
| 3,170,322 | 2/1965 | Cavanaugh . |
| 3,371,953 | 3/1968 | Blatt . |
| 3,451,250 | 6/1969 | Rolf et al. . |
| 3,635,514 | 1/1972 | Blatt ................................... 294/106 |
| 3,714,870 | 2/1973 | Blatt ..................................... 294/88 |
| 3,764,023 | 10/1973 | Jatcko . |
| 3,767,063 | 10/1973 | McKinven, Jr. ................... 294/110 |
| 4,043,011 | 8/1977 | Giraudi et al. ................... 29/243.57 |
| 4,234,223 | 11/1980 | O'Neil ................................. 294/88 |
| 4,294,444 | 10/1981 | Horton . |
| 4,368,913 | 1/1983 | Brockmann et al. ............... 294/106 |
| 4,518,187 | 5/1985 | Blatt et al. ............................ 294/88 |
| 4,596,415 | 6/1986 | Blatt .................................... 294/88 |
| 4,706,489 | 11/1987 | Dacey, Jr. ........................... 72/450 |
| 4,811,935 | 3/1989 | Tamura et al. ....................... 269/34 |
| 4,887,612 | 12/1989 | Esser et al. . |
| 5,085,480 | 2/1992 | Jackson ............................... 294/88 |

FOREIGN PATENT DOCUMENTS

| | | |
|---|---|---|
| 215739 | 11/1984 | Fed. Rep. of Germany . |
| 1180806 | 6/1959 | France . |
| 2223543 | 10/1974 | France . |
| 34222 | 2/1990 | Japan ................................... 72/314 |
| 776863 | 11/1980 | U.S.S.R. . |
| 848353 | 4/1981 | U.S.S.R. . |
| 966644 | 8/1964 | United Kingdom ................. 294/88 |

OTHER PUBLICATIONS

"Automation and Robotic Devices", Universal Automation Corp., Roseville, Mich.

Primary Examiner—Daniel C. Crane
Attorney, Agent, or Firm—Basile and Hanlon

[57] ABSTRACT

A workpiece engaging apparatus forms a hem at the edges of two overlapping sheets or workpieces. A plurality of guide members are pivotally interconnected at one end and have selectively shaped cams formed therein which are traversed by a cam follower driven by a linear drive. The cams and cam follower interact to pivot a hold down member mounted on one of the guide members into engagement with the overlapping workpieces to stationarily hold the workpieces during the hemming operation prior to the engagement of a hem bar attached to another of the guide members with an upstanding edge on one of the workpieces. Pivotal movement of the guide member having the hem bar attached thereto bends the flange of one of the workpieces around and over the edge of the adjacent workpiece to form a hem between the workpieces.

14 Claims, 6 Drawing Sheets

CAM OPERATED HEMMING APPARATUS

CROSS REFERENCE TO CO-PENDING APPLICATION

This application is a continuation-in-part of co-pending U.S. patent application Ser. No. 07/784,381, filed Oct. 29, 1991 in the name of Donald T. Jackson and entitled "Cam Operated Workpiece Engaging Apparatus", now abandoned, which is a divisional application of U.S. patent application Ser. No. 07/730,582, filed Jul. 15, 1991, now U.S. Pat. No. 5,085,480.

BACKGROUND OF THE INVENTION

1. Field of the Invention

The present invention relates to workpiece engaging tools used in manufacturing operations and, specifically, to hemming devices for forming a hem between two or more workpieces.

2. State of the Art

In manufacturing operations, various types of tools are employed to engage workpieces and/or to perform work on such workpieces. Typically, grippers and clamps are used to engage workpieces at the completion of one manufacturing operation and to remove such workpieces from one work station for subsequent transport to another work station or to a storage location.

In a typical stamping operation in which metal sheets are progressively formed to a final shape through a series of work operations in adjacently disposed stamping presses, grippers are employed to remove the metal sheet from each press and, in combination with additional parts handling equipment, to deposit the workpiece in an adjacent press or an intermediate idle station located between adjacent presses.

Typically, such grippers are formed of a number of interconnected pins and links which effect opening and closing of gripper jaws. Such mechanisms are complicated in construction and high in cost. Further, the pins and links of such grippers are employed to drive the gripper jaws into a position engaging the workpiece. This provides an inefficient and variable force to grip such workpieces.

In hemming applications, such as the manufacture of vehicle doors, deck lids, etc., the edge of one sheet of metal is bent around the edge of an adjacent disposed sheet to form a hem joining the two metal sheets together. Typically, a complex and elaborate machine is employed to bend the edge of one sheet around the edge of the adjacent sheet. Such machines utilize a complex arrangement of fluid cylinders and links to effect the bending of the metal edge or flange.

It would be desirable to provide a workpiece engaging apparatus for manufacturing operations which has a high workpiece engaging force and, yet, is simple in design. It would also be desirable to provide a workpiece engaging apparatus for manufacturing operations which can provide an infinite pressure to a workpiece. It would also be desirable to provide a workpiece engaging apparatus for manufacturing operations which simplifies a hemming application in which the edge of one sheet of metal is bent around the edge of another sheet of metal.

SUMMARY OF THE INVENTION

In one embodiment of the present invention, a workpiece engaging apparatus includes a linear drive means having a reciprocal drive member. Guide means for guiding the linear movement of the drive member is pivotally mounted to one end to the linear drive means. A first cam means is formed in the guide means. A cam follower means is mounted on the drive member and engages the first cam means in the guide means to control the linear movement of the drive member.

In this embodiment, a workpiece engaging means is pivotally connected to the linear drive means at one end. The workpiece engaging means includes a workpiece engaging portion at a second, opposed end. Second cam means are formed in the workpiece engaging means and engaged by the cam follower means. The second cam means has a predetermined shape to pivot the workpiece engaging means from an open position in which the workpiece engaging portion is spaced from a workpiece and an operative position in which the workpiece engaging portion engages a workpiece as the cam follower means extends with movement of the drive member along the length of the second cam means.

The first cam means preferably has a straight, linear configuration between its ends. The second cam means in the workpiece engaging means has an arcuate shape, preferably curving at a constant radius, to pivot the workpiece engaging means between the open and workpiece engaging positions.

This embodiment of the workpiece engaging apparatus of the present invention is ideally suited for hemming applications in which the edge of one metal sheet is bent around the edge of an adjacent metal sheet. This apparatus is simple in construction and is capable of generating the necessary force to effect the hemming operation.

In a second embodiment, the cam operated hemming apparatus of the present invention has a different construction, but is also employable in a hemming operation.

In the second embodiment, the apparatus comprises a first guide means having first and second opposed ends, with a first cam means formed therein and extending between the first and second ends. A second guide means with first and second ends and a second cam means extending therebetween and a third guide means having first and second opposed ends with a third cam means formed therein are also provided. The apparatus includes a base for supporting a stack of metal sheets for workpieces, a lower sheet or workpiece in the stack having an upstanding edge flange extending above an upper sheet or workpiece in the stack. The first guide means is fixedly connected to the base.

Cam follower means slidably traverse each of the first, second and third cam means for causing movement of the second and third guide means. A drive means, connected to the cam follower means, reciprocally drives the cam follower means between opposite ends of the first, second and third cam means.

Means are also provided for fixedly connecting the drive means to the third guide means. Means are provided for pivotally connecting the first, second and third guide means together at the first ends thereof. A hem bar is fixedly attached to the second end of the second guide means and is pivotal therewith between an open position spaced from the metal sheets or workpieces and an engaged position in which the hem bar engages and bends the flange on the lower sheet or workpiece over and into substantial registry with the top surface of the upper sheet or workpiece. Finally, a hold down bar is connected to the third guide means and is movable therewith between an open position and a workpiece engaging position in which the hold down bar holds the stack of sheets or workpieces in a fixed position during the bending of the flange of the lower workpiece over the edge of the upper workpiece.

Preferably, the first cam means has a selected shape so as to pivot the second and third guide means about the first ends thereof as the cam follower means traverses the first cam means. The first cam means preferably is formed with a first arcuate portion extending from the first end of the first guide means and a second substantially linear portion extending continuously from the first linear portion toward the second opposed end of the first guide means. The cam follower means, when traversing the second arcuate portion of the first cam means, pivots the second and third guide means about the cam follower means independent from the pivotal movement of the second and third guide means by the cam follower means and the second and third cam means.

The second cam means preferably has a first portion extending at a predetermined acute angle from an axis extending between the pivot means at the first end of the second guide means and the end of the second cam means adjacent the second end of the second guide means. The second cam means also includes a second portion extending continuously from the first portion toward the second end of the second guide means. The third cam means is preferably linear along its entire length.

The first arcuate portion of the first cam means, the first portion of the second cam means, and the third cam means are arranged such that the hold down bar engages the stack of workpieces before the hem bar engages the flange on the lower workpiece.

The drive means is preferably a linear drive means in the form of a fluid operated cylinder having a reciprocally extendible and retractable drive member extending therefrom. The cam follower means is connected to the end of the drive member.

Preferably, the first, second and third guide means each comprise pairs of identically constructed first guide members, second guide members and third guide members, respectively. One of each pair of the first, second and third guide members are arranged side-by-side in a first set of guide members. The other of each pair of first, second and third guide members are arranged side-by-side in a second set of guide members, spaced from the first set of guide members.

The pivotally connecting means preferably comprises a first pivot pin extending through the first ends of the first set of first, second and third guide members. A second pivot pin extends through the first ends of the second set of guide members. The cam follower means simultaneously engages the first, second and third cam means in each of the first and second sets of guide members.

The second embodiment of the present invention includes a unique hold down member or bar to ensure that the stack of metal sheets or workpieces are held in a secure, fixed position during the hemming operation. The shape of the cams and the interaction of the cams with the cam follower pivots certain of the guide members about their first ends to bring the hold down member into engagement with the stack of metal sheets or workpieces prior to the engagement of the hem bar with the flange of a lower workpiece to be hemmed over the edge of an adjacent sheet. The shape of the cams in this embodiment generates the high force needed to both hold the stack of workpieces stationary during the hemming operation as well as to hem the edge of one workpiece over the edge of an adjacent workpiece.

The apparatus of each embodiment of the present invention is simple in construction and, yet, provides an infinite force or pressure for securely engaging a workpiece. The cam means employed in the apparatus of the present invention may be designed in a variety of configurations to provide different movements for the workpiece engaging members as well as to vary the pressure generated by the workpiece engaging members on the workpieces.

BRIEF DESCRIPTION OF THE DRAWING

The various, features, advantages and other uses of the present invention will become more apparent by referring to the following detailed description and drawing in which.

DESCRIPTION OF THE PREFERRED EMBODIMENTS

Figure 1:
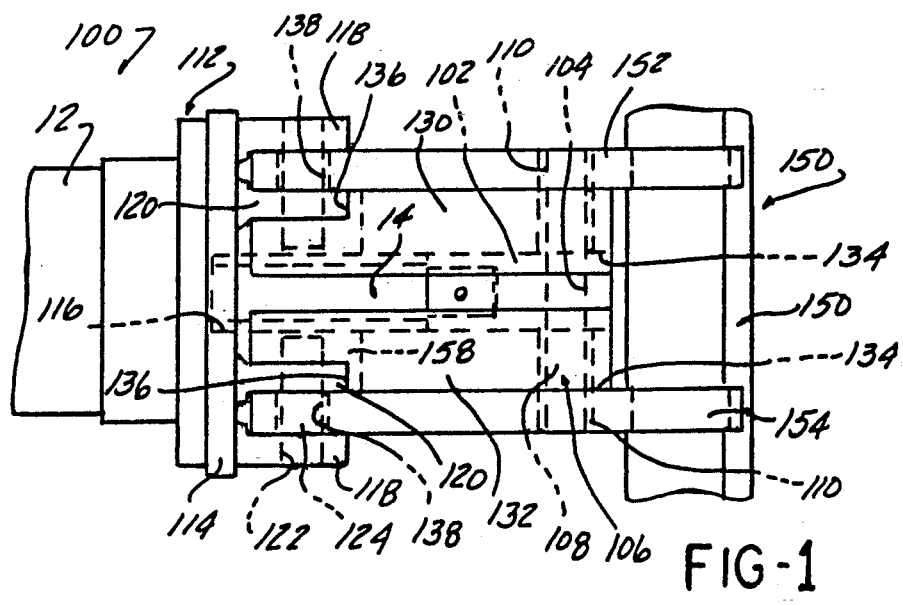
FIG. 1 is a plan elevational view of one embodiment of the apparatus of the present invention.

Throughout the following description and drawing, an identical reference number is used to refer to the same component shown in multiple figures of the drawing.

The present invention is an apparatus 10 for engaging workpieces. In one embodiment, the apparatus 10 is designed to act as a hemmer to bend the edge or flange of one metal sheet or workpiece around and over the edge of an adjacent overlaying sheet or workpiece to form a hem joining the two sheets or workpieces together.

Referring now to FIGS. 1, 2 and 3A–3D, there is depicted one embodiment of the workpiece engaging apparatus of the present invention. In this embodiment, the workpiece engaging apparatus 100 includes a linear drive means 12 having an extensible and retractable, reciprocal, linear drive member 14 mounted therein. Preferably, the linear drive means 12 comprises a fluid operated cylinder. The linear drive member 14 is a cylinder rod reciprocally mounted in the cylinder 12 and extending outward from one end of the cylinder 12. Valves, not shown, alternatingly apply pressurized fluid to opposite sides of a piston, also not shown, within the cylinder to reciprocate the piston and the cylinder rod 14 attached thereto between extended and retracted positions.

An enlarged cylinder rod end cap 102 is mounted to the outer end of the cylinder rod 14. The end cap 102 has a generally square cross section and extends a distance from the outer end of the cylinder rod 14, as shown in FIG. 1. The end cap 102 is attached to the cylinder rod 14 by suitable means, such as by welds, threads, set screws, etc.

A bore 104 is formed in the end cap 102 and extends transverse or substantially perpendicular to the axial length of the cylinder rod 14. Cam follower means denoted in general by reference number 106 is mounted in the bore 104 in the end cap 102. The cam follower means 106 preferably comprises a cross pin 108 which is fixedly mounted in the bore 104 and has opposed ends extending outward from the end cap 102. Pairs of bushings 110 are mounted on both outer ends of the cross pin 108.

A frame 112 is attached to the cylinder 12 for mounting the operative components of the workpiece engaging means to the cylinder 12. In a preferred embodiment, the frame 112 comprises a plate 114 which is secured by suitable means, such as welding, fasteners, etc., to the end of the cylinder 12. The plate 114 has a centrally located bore 116 through which cylinder rod 14 extends.

First and second pairs of arms, each comprising an arm 118 and an arm 120 spaced therefrom, are mounted on the plate 114 in a spaced apart arrangement as shown in FIG. 1. The arms 118 and 120 of each pair of arms are secured to the plate 114 by suitable means, such as by welding. As shown in FIG. 1, the ends of the arms 118 and 120 disposed in registry with the plate 114 have a notch portion, the purpose of which will be described in greater detail hereafter. In addition, each of the arms 118 and 120 has a through bore 122 which extends therethrough and is aligned with the corresponding bore 122 formed in the opposed arm of each pair of arms. The aligned bores 122 in each of the pairs of arms 118 and 120 receive a separate pivot pin 124.

Figure 2:
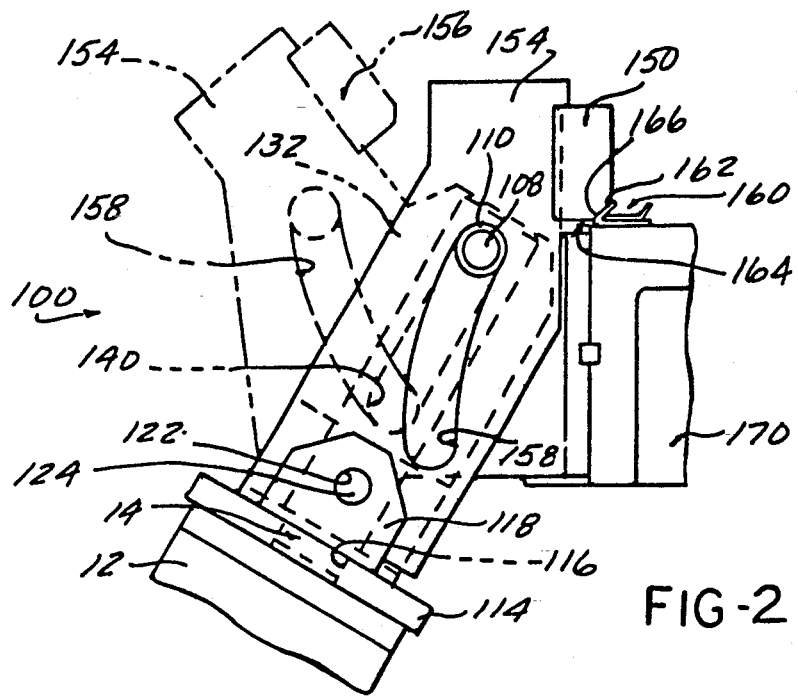
FIG. 2 is a front, elevational view of the apparatus shown in FIG. 1.

The apparatus 100 also includes guide means for guiding the linear movement of the drive member 14. The guide means is preferably in the form of first and second block members 130 and 132. The block members 130 and 132 are identically constructed and have a generally rectangular cross section and an elongated, planar form with cut off or notched ends, as shown in FIG. 2. The block members 130 and 132 are fixed to a frame 170 by means of a bracket 133 which is attached to the frame 170. Each of the block members 130 and 132 is provided with a centrally located notch extending from a first end which snugly engages the sides of the cylinder rod end cap 102, as shown in FIG. 1. The opposed or second end of each of the block members 130 and 132 is notched as shown by reference number 136 so as to snugly engage the arm 120 in each pair of arms 118 and 120.

Bores 138 are formed in each of the block members 130 and 132 adjacent the second end and are alignable with the bores 122 formed in each of the arm pairs 118 and 120 so as to slidably receive the pivot pins 124 therethrough to attach the second end of each of the block members 130 and 132 to the linear drive means 12.

Each of the block guide members 130 and 132 is provided with a first cam means denoted in general by reference number 140 in FIG. 2. Preferably, the first cam means 140 has a straight, linear form between its first and second ends. The bushings mounted on the outer ends of the cross pin 108 ride in the first cam means 140 in each of the block members 130 and 132 to control the linear extension and retraction of the drive member 14. It will be understood that the first cam means 140 may have other shapes, as necessary, for a particular application.

The apparatus 100 also includes workpiece engaging means denoted in general by reference number 150. The workpiece engaging means 150 comprises first and second outer plate members 152 and 154, respectively, and a workpiece engaging member 154. The first and second outer plates 152 and 154 have a generally planar configuration with a rectangular cross section. Bores are formed in one end of each of the first and second outer plates 152 and 154 to receive the pivot pins 124 therethrough to pivotally connect the first ends of each of the first and second outer plates 152 and 154 to the frame 112 attached to the linear drive means 12.

A second cam means denoted by reference number 158 is formed in each of the first and second outer plates 152 and 154, respectively. Each of the second cam means 158 is identically constructed and, preferably, has an arcuate shape curving at a constant radius along its length, as shown in FIG. 2.

Certain of the bushings on the cross pin 108 ride in the second cam means 158 in each of the first and second outer plates 152 and 154 to control pivotal movement of the first and second plates 152 and 154 between a workpiece engaging position shown in solid in FIG. 2 and an open position shown in phantom in FIG. 2 in which the workpiece engaging member 156 is spaced from the workpiece 160. It will be understood that the second cam means 158 may have other configurations, either arcuate at different radiuses or a combination of linear sections disposed at angles with respect to each other, depending upon the particular application for which the apparatus 100 is employed.

The workpiece engaging member 156, in the embodiment shown in FIGS. 1 and 2 which is designed for use in a hemming operation, has a block-like form with a first workpiece engaging edge 162, a second, spaced workpiece engaging edge 164, a flat surface 166 extending between the first and second edges 162 and 164 and a flat bottom surface 167. The workpiece engaging member 156 is secured to the second ends of the first and second outer plates 152 and 154 by suitable means, such as by welding. It will be understood that the shape of the workpiece engaging member 156 as well as its length may be varied to suit a particular application and the shape and size of the workpieces in such applications.

In the hemming application described by way of example only, the workpiece 160 is mounted on a frame 170 typically mounted in a tool or machine. The workpiece 160 in this example comprises a lower disposed metallic sheet 172 having an outer bendable edge or flange 174. An upper sheet 176 is disposed above and in registry with the lower sheet 172, as shown in FIGS. 3A–3D.

The operation of the apparatus 100 in a hemming operation will now be described in detail. It will be assumed that the linear drive member 14 has been retracted within the cylinder 12. In this position, the cross pin 108 carried by the linear drive member 14 has moved to a position adjacent the cylinder 12. During its prior retraction, the cross pin 108 rides within the first and second cams 140 and 158 and causes the first and second outer plates 152 and 154 to pivot about the pivot pins 124 to the position shown in phantom in FIG. 2. In this position, the workpiece engaging member 156 is spaced from the workpiece 160 mounted on the frame 170. As the piston in the cylinder 12 is actuated to cause extension of the linear drive member 14, the cross pin 108 traverses the first and second cams 140 and 158 and causes the first and second outer plate members, as well as the block members 130 and 132 to pivot about their interconnected first ends about pivot pins 124. The block members 130 and 132 drive the linear drive member 14 in a linear movement. However, the arcuate shape of the second cam means 158 causes the first and second outer plates 152 and 154 to pivot from the open position shown in phantom in FIG. 2 to the solid position shown in FIG. 2 in which the workpiece engaging member 156 is brought into gradual engagement with the workpiece 160.

Figure 3A:
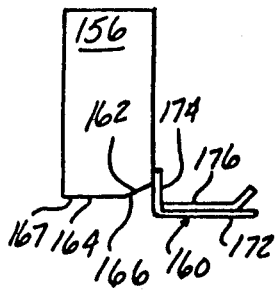
FIGS. 3A, 3B, 3C and 3D are partial, sequential representations of the use of the apparatus shown in FIGS. 1 and 2 in a hemming operation.

FIGS. 3A–3D depict the sequential movement and action of the workpiece engaging member 156 in hemming the outer edge or flange 174 of the lower sheet 172 about the edge of the upper sheet 176. As the workpiece engaging member 156 is brought into engagement with the workpiece 160 during the pivotal movement of the first and second outer plates 152 and 154, as described above, the first edge 162 will initially contact the upturned, perpendicular flange 174 of the lower sheet 172, as shown in FIG. 3A.

Figure 3B:
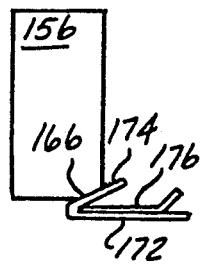
Figure 3C:
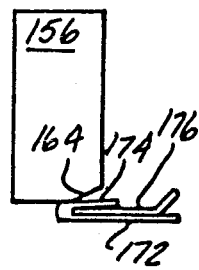

Continued pivotal movement of the first and second outer plates 152 and 154 will bring the flat surface 166 on the workpiece engaging member 156 into engagement with the flange 174 on the lower sheet 172 and cause a pivoting or bending of the flange 174 about the outer edge of the upper sheet 176, as shown in FIG. 3B. This causes the outer flange 174 to be bent to an approximate 45° with respect to the upper sheet 176. Continued pivotal movement of the first and second outer plates 152 and 154 will bring the second edge 164 on the workpiece engaging member 156 into engagement with the flange 174 of the lower sheet 172 resulting in a further bending of the flange 174 about the edge of the upper sheet 176, as shown in FIG. 3C.

Figure 3D:
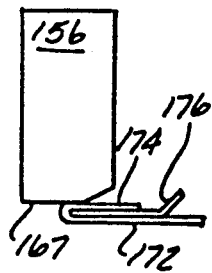

Finally, the workpiece engaging member 156 will be pivoted into the position shown in FIG. 3D in which the lower surface 167 on the workpiece engaging member 156 engages the flange 174 on the lower sheet 172 bending the flange 174 parallel to the remainder of the lower sheet 172 and in registry with the upper sheet 176 to complete the hemming operation.

A second embodiment of the present invention is shown in FIGS. 4–10. In this embodiment, the workpiece engaging apparatus 200 is also designed to form a hem between two stacked or overlapped metal sheets or workpieces.

Figure 4:
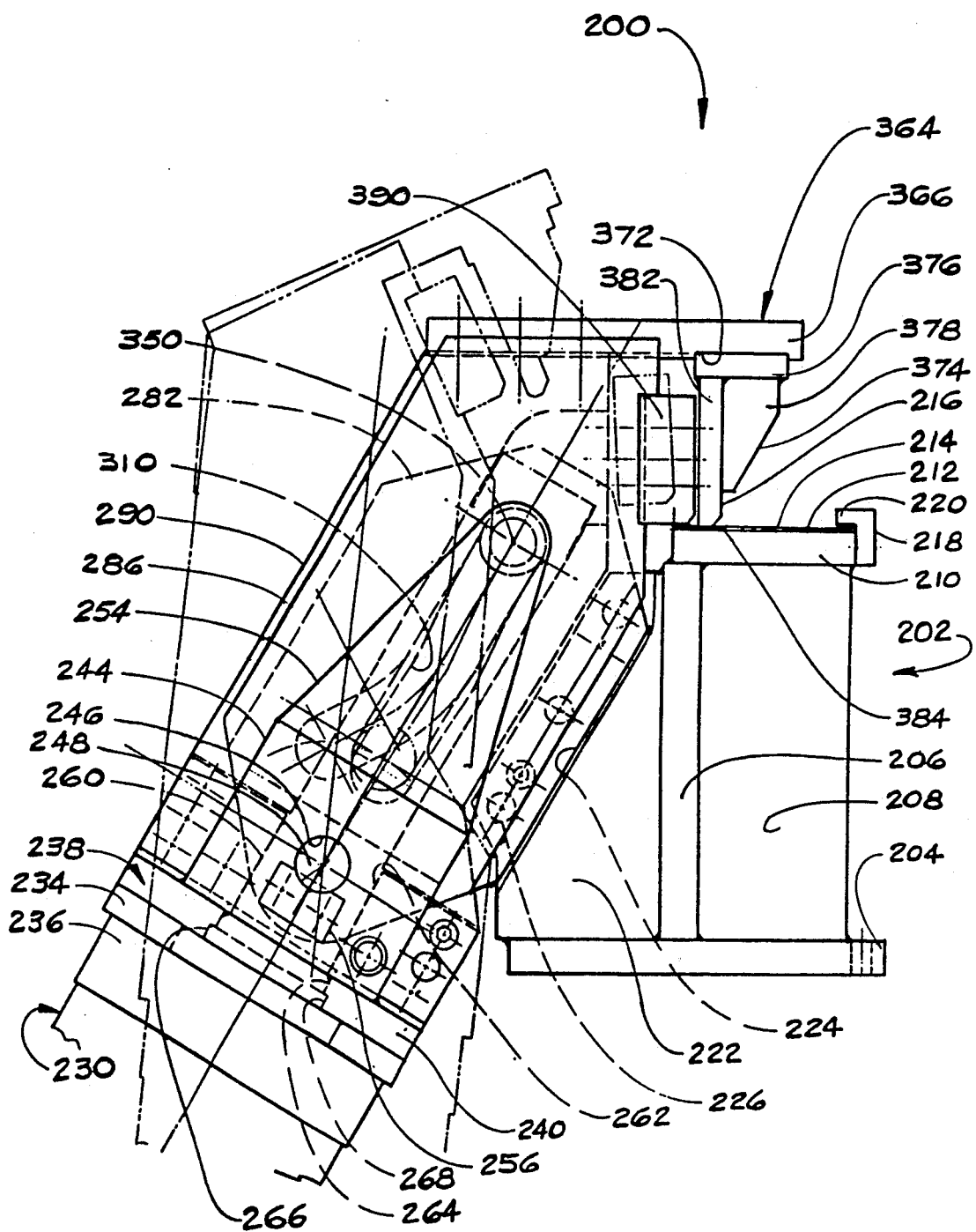
FIG. 4 is a side elevational view of a second embodiment of the present invention.
Figure 6:
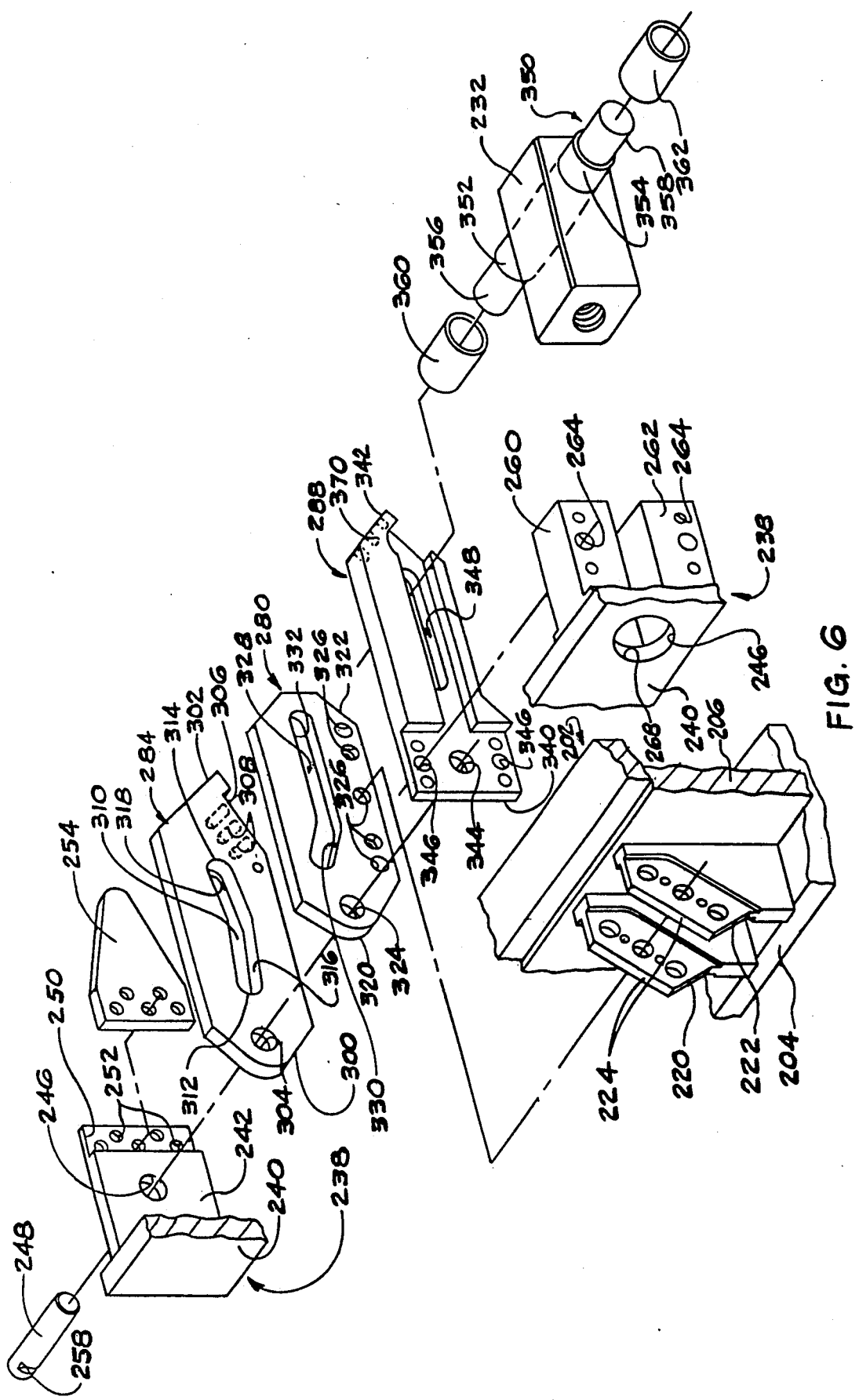
FIG. 6 is a partial, exploded, perspective view of the interconnection of the guide members, the base, the cylinder mounting block, the pivot pins and the cam follower shown in FIG. 4.
Figures 7, 8:
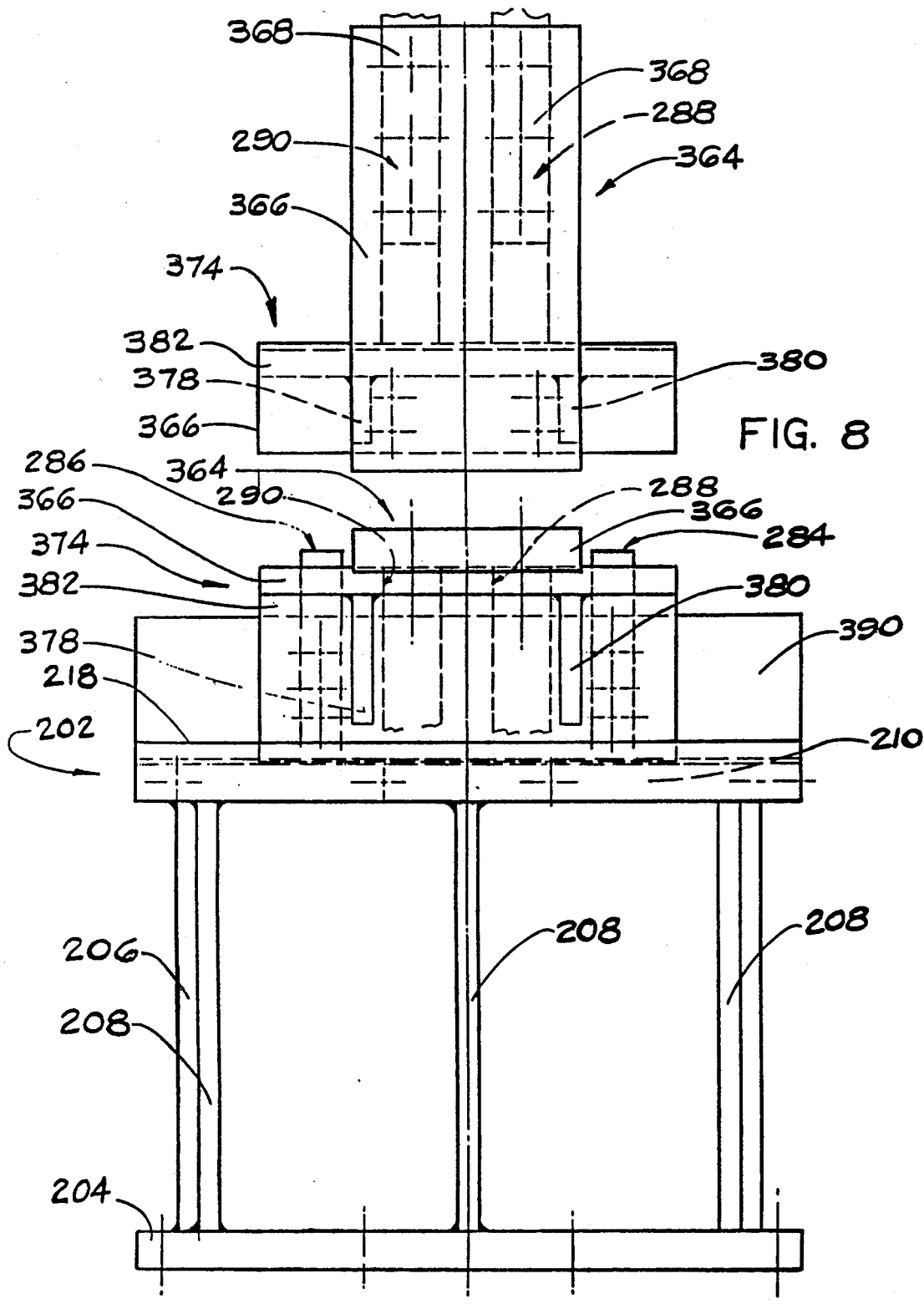
FIG. 7 is a end view of the base shown in FIG. 4.
FIG. 8 is a plan view of the hold down member shown in FIG. 4.

The workpiece engaging apparatus 200 includes a base denoted generally by reference number 202 in FIGS. 4, 6 and 7. The base 202 includes a lower mounting plate 204 which is provided with selectively arranged bores for receiving bolts, dowels or other fastening means to securely mount the base 202 to a suitable support surface, such as a frame, tool, etc. A vertical plate 206 is secured to the lower mounting plate 204 by welds and extends away from the lower mounting plate 204. A plurality of ribs 208, with three being shown by way of example only, are connected to the lower mounting plate 204 and the vertical mounting plate 206.

The ribs 208 have a generally rectangular configuration as shown in FIG. 4 and, in conjunction with the vertical plate 206, provide support for a top plate 210 which is welded thereto. The top plate 210 extends in parallel with the lower mounting plate 204 and provides a support surface for a stack of metal sheets or workpieces, with two overlapped, stacked sheets 212 and 214 being shown as an example in FIG. 4. It will be understood that the stack of workpieces arranged on the top plate 210 may include any number of sheets or workpieces. In a conventional manner, one of the workpieces, such as the lower sheet 212, will be provided with an outwardly extending flange 216 which would normally extend away from the plane of the sheet 212. This flange 216 is hemmed or bent over the edge of the adjacent sheet 214 and into substantial proximity with the top surface of the sheet 214 to form a hem joining the two sheets 212 and 214 together.

A retainer 218 is mounted to one edge of the top plate 210, as shown in FIG. 4, by means of suitable fasteners. The retainer 218 has an inverted L-shape, with the top leg 220 of the retainer 218 being spaced from the top surface of the top plate 210. The retainer 218 serves to retain at least one of the sheets, such as sheet 212, in the stack of sheets in a selected position on the top plate 210.

As shown in FIG. 4, and more clearly in FIG. 6, a pair of spaced arms 220 and 222 are welded or otherwise secured to the vertical plate 206 and the lower mounting plate 204, on the opposite side of the vertical plate 206 from the ribs 208. Each of the arms 220 and 222 includes an angularly disposed connector portion 224 which is provided with a plurality of bores 226 for receiving dowels, bolts, etc. to connect one of the guide members, described hereafter, in a fixed position to the base 202.

A drive means is provided for reciprocatingly moving a cam follower means, described hereafter, along cams formed in a plurality of guide means. The drive means 230 is preferably a linear drive means in the form of a fluid actuated cylinder. A piston, not shown, is slidably mounted within the cylinder 230 and is movable between opposite ends of the cylinder by means of valves or other control devices which selectively apply pressurized fluid to opposite sides of the piston. A linear drive member, such as a piston rod, also not shown, is connected to one end of the piston and extends externally from one end of the housing of the cylinder 230. The piston rod is reciprocally extendible and retractable upon bidirectional actuation of the cylinder 230 in a known manner. The piston rod threadingly engages one end of a piston rod block 232 shown in FIG. 5. The piston rod block 232 has a generally elongated, rectangular shape and supports the cam follower means at an opposite end, as described hereafter.

Figure 5:
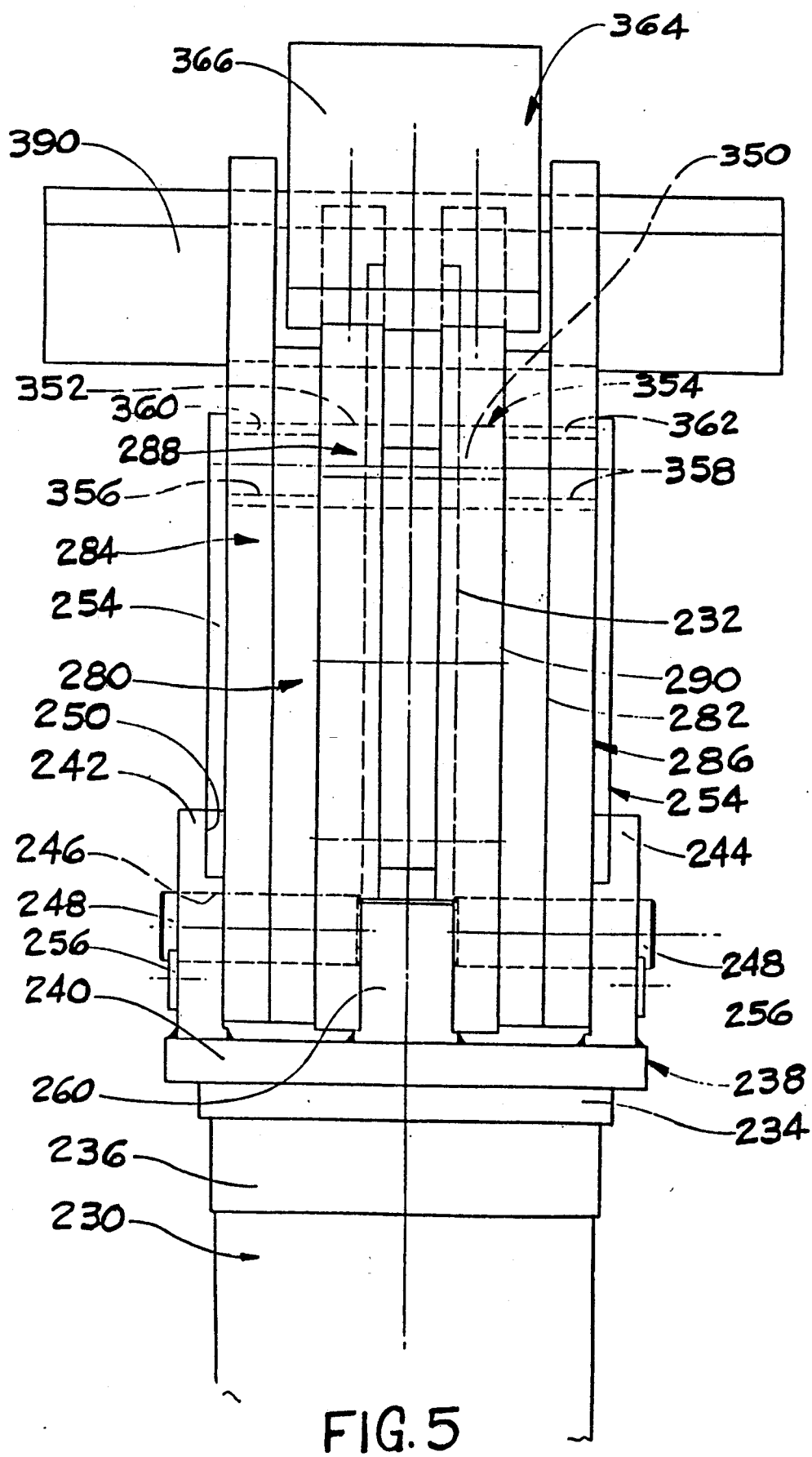
FIG. 5 is a plan view of the guide members of the second embodiment of the present invention taken in the direction of the arrow in FIG. 4.

A spacer 234 is attached to the end cap 236 of the cylinder 230 to a cylinder mounting bracket denoted generally by reference number 238 in FIGS. 4, 5 and 6.

The cylinder mounting bracket 238 includes an end plate 240 on which are attached a pair of spaced side legs 242 and 244. The side legs 242 and 244 are mounted at opposite ends of the end plate 240 and extend outward from one side of the end plate 240. The side legs 242 and 244 are identically constructed as mirror images of each other. As shown in FIG. 6, the side leg 242 has a through bore 246 formed therein which receives a pivot means, such as a pivot pin 248 therethrough. The outer end of the side leg 242 is undercut as shown by reference number 250. A plurality of bores 252 for receiving threaded fasteners and dowels are formed in the undercut end 250 of the side leg 242 for receiving dowels and threaded fasteners, not shown, to attach a cover plate 254 to the side leg 242. The cover plate 254 covers the cam means described hereafter in the guide means. A similar cover 254 is also attached to the opposed side leg 244.

The pivot pins 248, which are mounted in each of the side legs 242 and 244, are retained in a fixed position in the bores 246 in the side legs 242 and 244 by means of a keeper 256 which is fixedly mounted to each of the side legs 242 and 244 and engages a slot 258, shown in FIG. 6, in each pivot pin 248.

As shown in FIGS. 4, 5 and 6, upper and lower blocks 260 and 262, respectively, are mounted centrally on the end plate 240 of the cylinder mounting bracket 238. The upper and lower blocks 260 and 262 are spaced on opposite sides of a bore 264 formed in the end plate 240 through which the piston rod of the cylinder 230 reciprocally extends. Each of the upper and lower blocks 260 and 262 is provided with a plurality of bores 264 which are threaded or smooth to receive various fasteners, such as bolts, dowels, etc., to fixedly connect one of the guide members, described hereafter, to the upper and lower blocks 260 and 262. A spacer ring 266 is mounted in an enlarged diameter end portion 268 of the bore 264.

The apparatus 200 of second embodiment of the present invention is provided with first, second and third guide means which control the pivotal movement of various elements of the apparatus 200, as described hereafter. Although the first, second and third guide means may be provided in a single set formed of single first, second and third guide members, preferably, the first, second and third guide means each comprises a pair of spaced, identically constructed, first, second and third guide members.

As shown in FIGS. 4–8, the apparatus 200 is provided with a pair of first inner guide members 280 and 282, a pair of outer guide members 284 and 286, and a pair of center guide members 288 and 290.

As each of the pair of first, second and third guide means are identically constructed to the corresponding guide member of each pair, the following description will be provided for only one of each of the first, second and third guide members, it being understood that the opposite guide member of each pair is identically constructed.

As shown in FIGS. 4 and 6, the outer guide member 284 is in the form of a plate having a first end 300 and an opposed second end 302. A bore 304 is formed in the outer guide member or plate 284 adjacent the first end 300 thereof and receives the pivot pin 248 therethrough to pivotally mount the outer guide member 284 to the cylinder mounting bracket 238. A step or cutback portion 306 is formed adjacent the second end 302 of the outer guide plate 284. A plurality of bores 308 are formed in the step portion 306 which receive fasteners for attaching a hem bar, described hereafter, to the second end of the outer guide member 284.

A cam means denoted generally by reference number 310 is formed in the outer guide member 284 and has a first end 312 located adjacent to the first end 300 of the outer guide member 284 and an opposed second end 314 disposed adjacent the second end 302 of the outer guide member 284. The cam means 310 is provided with a selective shape to provide a specific pivotal movement of the outer guide member 284. Preferably, the cam means 310 includes a first portion 316 extending from the first end 312 of the outer guide member 284 which is disposed at an acute angle from an axis extending between the center of the bore 304 and the center of the second end 314 of the cam means 310. The cam means 310 also includes a second portion 318 which extends continuously from one end of the first portion 318. As shown in FIG. 6, the second portion 318 is provided at an arcuate angle to the first portion 316.

The inner guide member 280 is also in the form of a plate having a first end 320 and an opposed second end 322. A through bore 324 is formed in the inner guide member or plate 280 adjacent the first end 320 and receives the pivot pin 248 therethrough to pivotally mount the inner guide member 280 to the cylinder mounting bracket 238. A plurality of bores 326 are formed in the inner guide member 280 adjacent a lower edge thereof. The bores 326 are threaded and smooth to receive dowels and threaded fasteners to locate and securely attach the inner guide member 280 to the connecting portion 224 of the arm 220 on the base 202. In this manner, the inner guide member 280 is fixedly connected to the base 202 in a non-movable manner.

The inner guide member 280 includes a cam means 328 having a first arcuate portion 330 extending from the first end 320 of the inner guide member 280. A second substantially linear portion 332 is formed in the cam means 328 and extends continuously one end of the arcuate portion 330 toward the second end 322 of the inner guide member 280.

The center guide means 288 is also in the form of a plate having a first end 340 and an opposed second end 342. The first end 340 is formed with a narrow, cutback surface in which a through bore 344 is formed to receive the pivot pin 248. A plurality of bores denoted generally by reference number 346 are also formed in the cutback surface at the first end 340 of the center guide member 288 and receive suitable fasteners for fixedly connecting the center guide member 288 to the upper and lower blocks 260 and 262 on the cylinder mounting bracket 238 as shown in FIG. 6. In this manner, the center guide member 288 is fixedly connected to the cylinder mounting bracket 238 and the drive means or cylinder 230 attached to the cylinder mounting bracket 238, as described hereafter.

The center guide member 288 is provided with a cam means 348 which is preferably substantially linear between opposite ends.

A drive pin denoted generally by reference number 350 is driven by the linear drive member or piston rod of the cylinder 230. The piston rod end 232 connected to the end of the piston rod, as described above, has a transverse bore formed at an outer end, as shown in FIG. 6, in which the drive pin 350 is fixedly mounted. The drive pin 350 has a central enlarged diameter portion with first and second opposed portions 352 and 354 extending outward from the piston rod end 232. Outer end portions 356 and 358 of a reduced diameter extend from the opposed portions 352 and 354. Bushings 360 and 362 are mounted on the reduced diameter end portions 356 and 358, respectively.

The reduced diameter end portions 356 and 358 and the associated bushings 360 and 362 extend laterally from the piston rod end 232 and slidably engage the cams 310 and 328 and the outer guide member 284 and the inner guide member 280 disposed on opposite sides of the piston rod during extension and retraction of the piston rod and the drive pin 350, as described hereafter. The enlarged central end portions 352 and 354 of the drive pin 350 slidably engage the cams 328 in the center guide members 288 and 290.

The pairs of inner guide members 280 and 282, the outer guide members 284 and 286, and the center guide members 288 and 290 are arranged in two spaced sets. The first set of guide members includes the outer guide member 284, the inner guide member 280 and the center guide member 288 which are arranged side-by-side as shown in FIG. 5. The second set of guide members includes the center guide member 290, the inner guide member 282 and the outer guide member 286 which are also arranged side-by-side.

As shown in FIGS. 4, 5, 7 and 8, the apparatus 200 includes a hold down means 364 for holding the stack of metal sheets 212 and 214 in a stationary position during the hemming operation. The hold down means 364 includes a generally rectangular plate 366 which includes bores denoted generally by reference number 368 which receive fasteners for attaching the plate 366 to mating bores 370 formed in the second end 342 of each of the center guide members 288 and 290, as shown in FIGS. 6 and 8.

A transverse extending slot 372 is formed at one end of the plate 366 and receives a hold down member denoted generally by reference number 374. The hold down member 374 includes a top plate 376 which is mounted in the transverse slot 372 and connected to the plate 366 by suitable fasteners. A pair of ribs 378 and 380 are welded or otherwise secured to the upper plate 376 and a hold down bar 382. As shown in FIG. 4, the workpiece engaging end of the hold down bar 382 has an angled edge 384, such as a 45° angled edge.

The hold down means 364 functions to hold the stack of workpieces or sheets 212 and 214 in a stationary position on the top plate 210 of the base 202 during the hemming operation. Since the hold down means 364 is fixedly connected to the ends of the center guide members 288 and 290, the hold down means 364 pivots with the center guide members 288 and 290 from the workpiece engaging position shown in solid in FIG. 4 to a spaced, open position shown in phantom in FIG. 4.

As shown in FIGS. 4, 5 and 7, a hem bar 390 generally in the form of an elongated, rectangular plate, is secured by fasteners to the bores 308 in the second end 302 of the outer guide members 284 and 286. The hem bar 390 is thus movable with pivotal movement of the outer guide members 284 and 286 from a hemming position shown in solid in FIG. 4 to a spaced, open position shown in phantom in FIG. 4. A lower edge of the hem bar 390 has an angled surface, generally formed at a 45° angle, to bend the edge or flange of the lower sheet 212 around and into substantial registry or proximity with the top surface of the upper sheet 214 during the hemming operation, as in the same manner as described above and shown in FIGS. 3A-3D.

Figure 9:
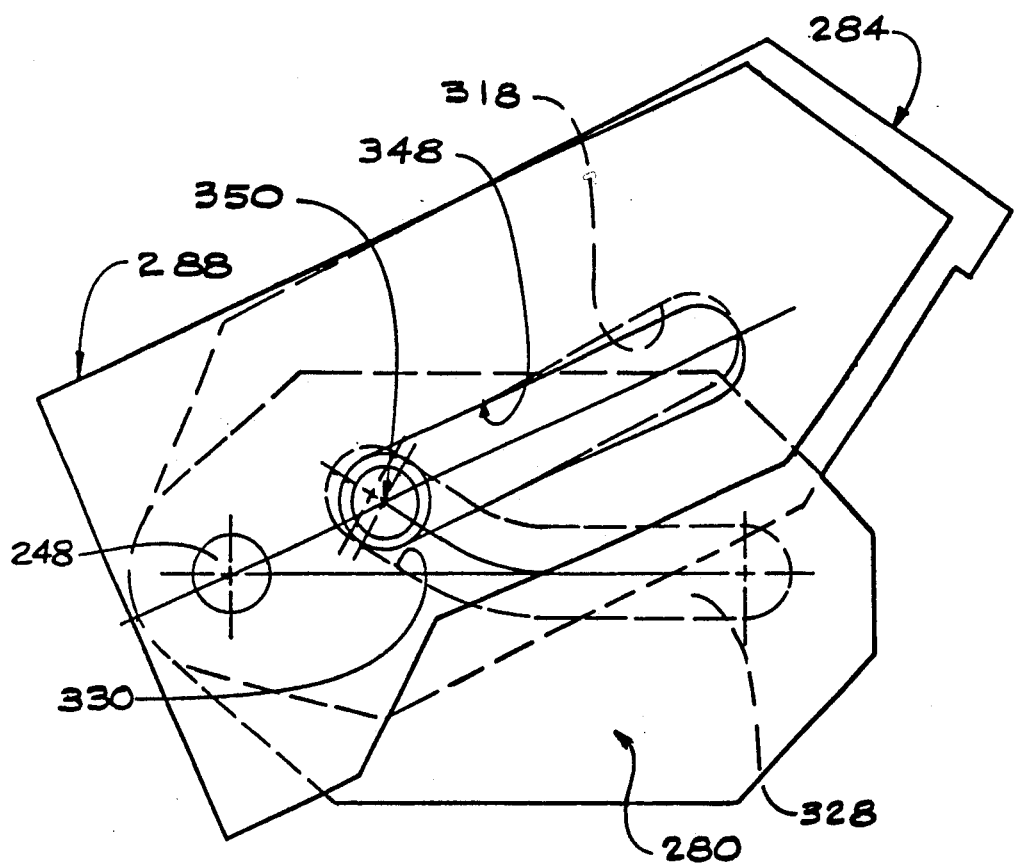
FIG. 9 is a pictorial view of the portions of the guide members in the open position.
Figure 10:
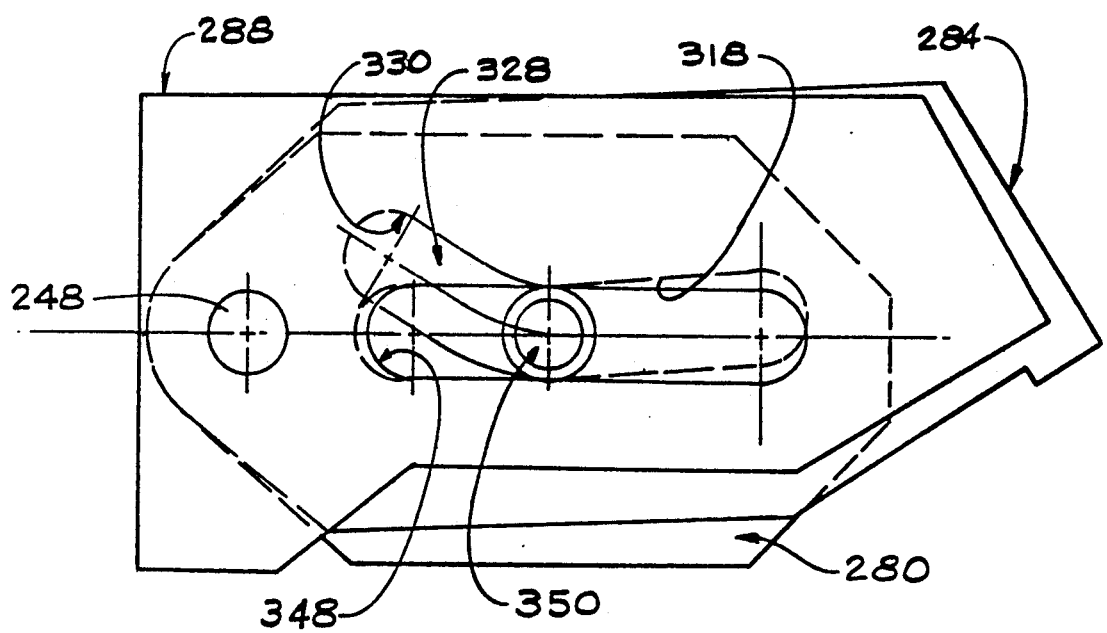
FIG. 10 is a pictorial view of the portions of the guide members in an intermediate position.

The operation of the workpiece engaging apparatus 200 in forming a hem to join the sheets 212 and 214 together will now be described with reference to FIGS. 9 and 10. FIG. 9 depicts the open position of the workpiece engaging apparatus in which the piston rod of the linear drive cylinder 230 is fully retracted in the cylinder 230. In this position, the cam follower or drive pin 350 has moved to the second ends of each of the cams 310, 328 and 348 in the outer guide members 284 and 286, the inner guide members 280 and 282, and the center guide members 288 and 290, respectively. In this position, the hold down means 364 and the hem bar 390 are spaced from the base 202 to allow the insertion or removal of a stack of metal sheets or workpieces, such as sheets 212 and 214, to or from the base 202.

Upon energization of the drive means or cylinder 230, the piston rod will extend thereby driving the drive pin 350 outward from the cylinder 230. During such movement, the drive pin 350 traverses the cams in the pairs of inner, outer and center guide members causing pivotal movement of the pairs of outer guide members 284 and 286 and the center guide members 288 and 290 from the open position shown in FIG. 8 to an intermediate position shown in FIG. 9 in which the drive pin 350 is substantially in the center of each of the cams in the pairs of guide members. In this position, the center guide members 288 and 290 have completed their pivotal movement from the open position to the workpiece engaging position thereby bringing the hold down means 364 and, in particular, the hold down bar 382, into engagement with the stack of sheets or workpieces 212 and 214 mounted on the top plate 210 of the base 202. It should be noted, that in this position of the guide plates, the outer guide members 284 and 286 are still capable of further pivotal movement due to the angular shape of the two portions 316 and 318 of the cams 310 in the outer guide members 284 and 286. Thus, during further extension of the piston rod and the drive pin 350, the drive pin 350 will cause further pivotal movement of the outer guide members 284 and 286 about their respective first ends and the pivot pins 248 to bring the hem bar 390 into engagement with the raised flange on the lower sheet 212 and to bend or hem the flange around the edge and over the top surface of the upper sheet 214 as described above.

It should be noted that during the initial stages of extension of the piston rod and the drive pin 350, the drive pin 350 will traverse the arcuate first end portion 330 of the cams 328 in the inner guide members 280 and 282. Since the inner guide members 280 and 282 are fixedly connected in a stationary position to the base 202, during the traversal of the arcuate portion 330 of the cams 328 in the inner guide members 280 and 282 by the drive pin 350, the pairs of outer guide members 284 and 286 and the center guide members 288 and 290 will pivot together about the drive pin 350 from the open position toward the workpiece engaging position. This pivotal movement brings the hold down means 364 attached to the center guide members 280 and 288 into engagement with the stack of metal sheets 212 and 214 mounted on the base 202. Further, during such pivotal movement of the center guide members 288 and 290, the drive means or cylinder 230, due to its fixed connection via the cylinder mounting bracket 238 to the center guide plates 288 and 290, as described above, likewise pivots.

After hemming is complete, the piston rod is retracted by activation of suitable control valves on the drive cylinder 230 which causes the drive pin 350 to traverse the cams in the pairs of guide members from the second ends toward the first ends thereof. A reversal of the sequence described above then takes place during which the outer guide members 280 and 28 immediately pivot a short distance to move the hem bar 390 out of engagement with the stack of metal sheets 212 and 214. This occurs during the movement of the drive pin 350 along the second portion 318 of the cams 310 in the outer guide members 284 and 286. When the guide pin 350 traverses the arcuate second end portion 330 of the cams 328 in the inner guide members 280 and 282, both pairs of outer guide members 284 and 286 and the center guide members 288 and 290 pivot to the open position shown in phantom shown in FIG. 4 thereby retracting the hold down means 364 out of engagement with the stack of metal sheets 212 and 214.

In summary, there has been disclosed a unique cam operated workpiece engaging apparatus which may be advantageously used in hemming operations to bend an edge or flange on one metal sheet over the edge of an adjacent overlaying sheet or workpiece to join the sheets together. The apparatus is of simple construction and is designed to provide infinite pressure or force on a workpiece. Further, the amount of force and its time or duration of application in the hemming operation may be easily varied by simple modifications to the shape of the cams used in the apparatus.

What is claimed is:

1. An apparatus for hemming an upstanding flange on a lower workpiece of a stack of at least two workpieces over the edge and into substantial proximity with an overlaying workpiece in the stack, the apparatus comprising:

first guide means having first and second opposed ends, with a first cam means formed in and extending between the first and second ends thereof;

second guide means having first and second opposed ends and a second cam means formed in and extending between the first and second ends thereof;

third guide means having first and second opposed ends and a third cam means formed in and extending between the first and second ends thereof;

a base for supporting a stack of workpieces;

the first guide means being fixedly connected to the base so that the first guide means is immovably mounted;

cam follower means slidably mounted in each of the first, second and third cam means, for traversing the first, second and third cam means;

drive means, connected to the cam follower means, for reciprocatingly driving the cam follower means between opposite ends of the first, second and third cam means simultaneously;

means for pivotally connecting the first, second and third guide means together at the first ends thereof so that the second and third guide means are pivotal with respect to the first guide means;

means for fixedly connecting the drive means to the third guide means so that the drive means pivots with the third guide means;

a hem bar fixedly attached to the second end of the second guide means and pivotal therewith between an open position spaced from the stack of workpieces mounted on the base and a workpiece engaged position in which the hem bar engages and bends a flange on a lower workpiece in the stack over and into substantial proximity with a top surface of an upper workpiece; and a hold down bar connected to the third guide means and movable therewith between and open position spaced from the base and an engaged position to hold the stack of workpieces in a fixed position on the base during the bending of the flange of the lower workpiece over the edge of the upper workpiece.

2. The apparatus of claim 1 wherein:

the first cam means has a selected shape to pivot the second and third guide means and to bring the hold down bar into engagement with the stack of workpieces mounted on the base as the cam follower means traverses the first cam means.

3. The apparatus of claim 2 wherein:

the first cam means has a first substantially arcuate portion extending from the first end thereof; and a second substantially linear portion extending continuously from the first arcuate portion toward the second end of the first guide means.

4. The apparatus of claim 3 wherein:

the cam follower means and the first arcuate portion of the first cam means cooperate to pivot the second and third guide means together and the cam follower means cooperates with the second linear portion of the first cam means and an angular end portion of the second cam means to cause further pivotal movement of the second guide means.

5. The apparatus of claim 4 wherein:

the second cam means includes:

a first portion extending from the first end of the second guide means; and a second portion extending continuously from the first portion toward the second end of the second guide means and disposed at an angle with respect to the first portion of the second cam means.

6. The apparatus of claim 5 wherein the third cam means is linear between opposed ends.

7. The apparatus of claim 6 wherein:

the first arcuate portion of the first cam means, the first portion of the second cam means and one end of the third cam means are arranged side-by-side such that the hold down bar engages the stack of workpieces on the base prior to the engagement of the hem bar with the flange on one of the workpieces.

8. The apparatus of claim 1 wherein the drive means comprises:

a linear drive means having a reciprocally extendible and retractable drive member;

the cam follower means being connected to one end of the drive member.

9. The apparatus of claim 8 wherein the linear drive means comprises:

a fluid operated cylinder having a piston mounted therein which reciprocates a drive member under fluid pressure; and the drive member comprising a piston rod connected to the piston and having an end extending outward from the cylinder.

10. The apparatus of claim 9 wherein the cam follower means comprises:

a drive pin connected to the end of the piston rod and extending transversely of the piston rod into slidable engagement with each of the first, second and third cam means.

11. The apparatus of claim 1 wherein the base further comprises:

retainer means mounted on the base for retaining the stack of workpieces in a selected position on the base.

12. The apparatus of claim 1 wherein the first, second and third guide means respectively comprise:

a pair of first guide members, each having first and second opposed ends and a first cam means mounted therein;

a pair of second guide members, each having first and second opposed ends and a second cam means formed therein;

a pair of third guide members, each having first and second opposed ends and a third cam means formed therein;

one of each pair of first, second and third guide members being arranged side-by-side in a first set of guide members; and the other of each pair of first, second and third guide members being arranged side-by-side in a second set of guide members.

13. The apparatus of claim 12 wherein the pivot means comprises:

a first pivot pin extending through the first ends of the first, second and third guide members of the first set of guide members; and a second pivot pin extending through the first ends of the first, second and third guide members in the second set of guide members.

14. The apparatus of claim 12 wherein:

the cam follower means simultaneously engages the first, second and third cam means in each of the first and second sets of guide members.

* * * * *